United States Patent [19]

Arefinejad et al.

[11] Patent Number: 4,874,205
[45] Date of Patent: Oct. 17, 1989

[54] RECLINER ASSEMBLY FOR VEHICLE SEAT

[75] Inventors: Majid Arefinejad, Southfield; Dennis J. Brothers, St. Clair Shores; Frederick Kosinski, Royal Oak, all of Mich.

[73] Assignee: Semec, Inc., Troy, Mich.

[21] Appl. No.: 179,739

[22] Filed: Apr. 11, 1988

[51] Int. Cl.4 .............................................. B60N 1/02
[52] U.S. Cl. ..................................... 297/379; 297/367
[58] Field of Search ......................... 297/378, 379, 367

[56] References Cited

U.S. PATENT DOCUMENTS

| | | | |
|---|---|---|---|
| 4,082,352 | 4/1978 | Bales et al. | 297/367 X |
| 4,103,970 | 8/1978 | Homier | 297/379 X |
| 4,279,442 | 7/1981 | Bell | 297/379 X |
| 4,295,682 | 10/1981 | Kluting et al. | 297/367 |
| 4,357,050 | 11/1982 | Fisher, III | 297/367 |
| 4,384,744 | 5/1983 | Barley | 297/367 |
| 4,394,048 | 7/1983 | Sakurai | 297/379 X |
| 4,659,146 | 4/1987 | Janiaud | 297/367 |

FOREIGN PATENT DOCUMENTS

| | | | |
|---|---|---|---|
| 2404598 | 8/1975 | Fed. Rep. of Germany | 297/367 |
| 2254199 | 7/1975 | France | 297/367 |

Primary Examiner—Peter A. Aschenbrenner
Assistant Examiner—Thomas A. Rendos
Attorney, Agent, or Firm—Ralph T. Rader

[57] ABSTRACT

A dual sided recliner assembly which minimizes interference and wear of the teeth of the engaging parts while providing a compact and enclosed construction for longer service life. The backrest of the seat is secured between opposed moving plates, each one including a recessed area having two arcuate slots and an arcuate rack along one of the edges within the recessed area. The width of the opening provided in one of the slots is uniform whereas the width of the opening within the other slot is irregular such that a portion of its length is wider than the other portion. The moving plate is rotatably supported on a stationary plate and a coil power spring biases the moving plate toward a fully reclined forward position. The stationary plate also includes a recessed area which is opposed to the recessed area in the moving plate when the plates are assembled. A pawl is contained between the recesses of the plates for movement therein. The pawl is moved into engagement with the rack by a cam that is mounted on a spring biased camshaft. When the handle is rotated, the pawl is released from the rack thereby permitting automatic movement of the backrest toward a fully reclined forward position. During this movement, the narrow portion of the irregularly shaped slot moves into engagement with the camshaft thereby causing translational movement of the camshaft for maintaining a spaced relation between the pawl and rack until the backrest is returned to its upright position.

7 Claims, 4 Drawing Sheets

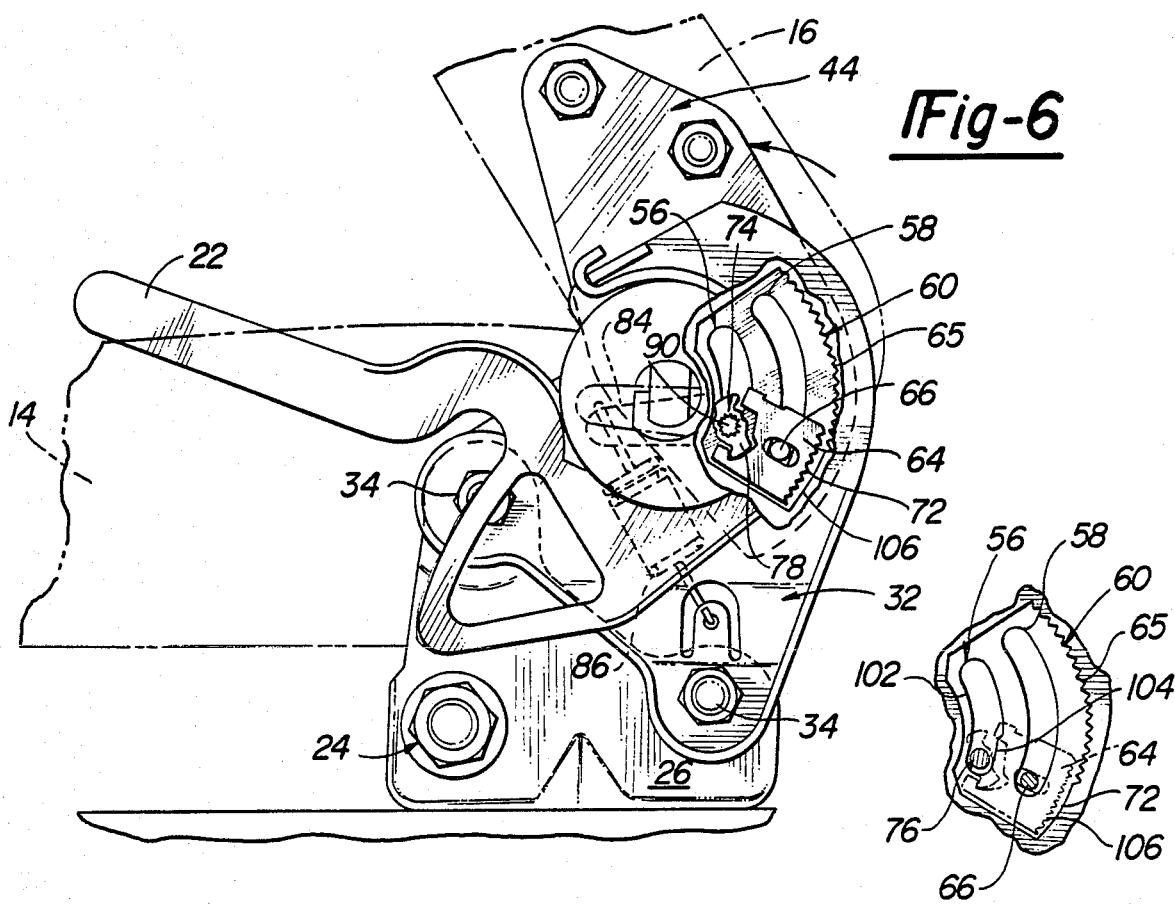
Fig-6
Fig-6A
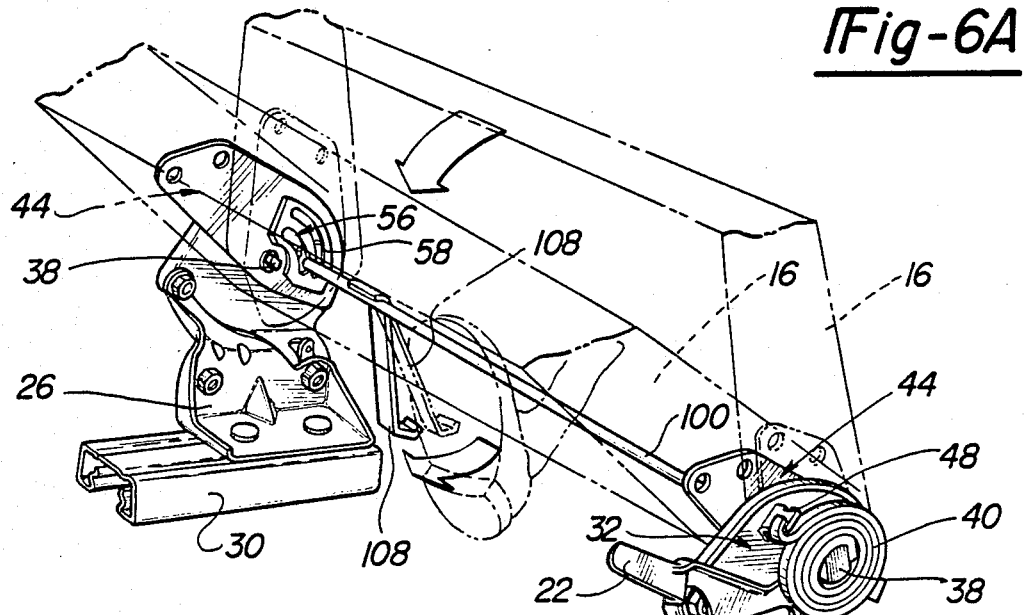
Fig-7

RECLINER ASSEMBLY FOR VEHICLE SEAT

BACKGROUND OF THE INVENTION

The present invention relates to a dual sided recliner assembly for automotive seats which permits inclining and reclining of the backrest relative to the bottom part of the seat.

Automobiles and other vehicles are typically equipped with a seat whose position is adjustable for several reasons including driver comfort and to permit easier entry and exit from the vehicle. Moder automobiles are frequently equipped with seat positioners permitting adjustment in a number of directions including fore and aft, up and down, and tilting. These devices may also include means for permitting the inclining and reclining of the backrest relative to the bottom part of the seat. The fore and aft or longitudinal positioning of the seat is typically accomplished by means of longitudinally extending tracks having carrier slides thereon which are selectively lockable to permit the seat to be adjusted through a plurality of longitudinal positions. Similarly, the inclining and reclining of the backrest may typically be accomplished by means of adjustable hinges which are attached to the backrest.

Problems with recliner mechanisms for the backrest of a seat may include complexity, lack of compactness, and the components being open. Further, in recliner mechanisms which include releasable teeth, there have been problems with wear and damage to the teeth resulting from the shock forces that occur when the teeth re-engage during movement of the backrest.

It is, therefore, an object of the present invention to provide a recliner assembly which is compact with the principle components of the assembly being enclosed for longer service life. It is a further object of the present invention to provide a recliner assembly which minimizes or eliminates interference, wear and potential damage to the teeth of engaging parts. Moreover, it is an object of the present invention to provide a recliner assembly having improved operating characteristics in connection with the inclining and reclining of the backrest. These and other objects are addressed by the present invention.

SUMMARY OF THE INVENTION

In accordance with the present invention, a dual sided recliner assembly for automotive seats is disclosed which permits inclining and reclining of the backrest relative to the bottom part of the seat. The recliner assembly includes right and left subassemblies with the component parts of one subassembly being the mirror image of the component parts of the other subassembly, except that, a rotatable actuating handle is provided on one of the subassemblies.

Each subassembly includes a support bracket which is secured to a longitudinally extending floor mounted track. A stationary plate is attached to the bracket for rotatably supporting a pivot pin having one end lockingly engaged with a coil power spring while its opposite end is lockingly engaged with a moving plate. The moving plate is attached to the backrest of the seat and is constantly biased by the power spring to rotate the backrest toward a fully reclined forward position.

The moving plate includes a recessed area having two arcuate slots and an arcuate rack or tooth form along one of the edges within the recessed area. The width of the opening provided on one of the slots is uniform along its length. The width of the opening within the other slot is irregular such that a portion of its length is of one width and another portion of its length is of a greater width.

The stationary plate also includes a recessed area which is opposed to the recessed area in the moving plate when the plates are assembled. A pawl is contained between the opposed surfaces of the recesses for movement therein. The pawl is slidably retained by a pin which extends through one of the moving plate slots for attachment to the stationary plate. An arcuate toothed portion is provided on one edge of the pawl for selective engagement with the toothed portion of the arcuate rack. The pawl is selectively moved radially by means of a cam that is rotatable within the irregularly shaped slot of the moving plate. The cam is normally spring biased for pushing the pawl toward the arcuate rack thereby engaging the toothed portion of the pawl with the toothed portion of the rack.

If the handle is manually rotated, the bias of the spring force on the cam is overcome which results in the cam pulling the pawl away from the rack thereby releasing the toothed portion of the pawl from the toothed portion of the rack. When the pawl is released from the rack, the rotational biasing force from the coil power spring is transmitted through the pivot pin in the stationary plate to the moving plate and therefore, the backrest is moved toward a fully reclined forward position. The backrest may also be moved toward a fully reclined rear position by exerting a force on the backrest in a direction opposite to the force being applied by the power spring. The rotational movement of the handle is transmitted from one subassembly to the other subassembly through a tie rod so that the pawls in both subassemblies are unlocked at the same time.

When the backrest is in a generally upright position, as would be typically encountered when the passenger opens the automobile door for entry, the toothed portion of the pawl is lockingly engaged at one area of the toothed portion of the rack. Further, the bias of a spring is transmitted through a camshaft to the cam and to the pawl for holding the toothed portion of the pawl in engagement with the toothed portion of the rack. Moreover, the camshaft is positioned within the wider portion of the irregularly shaped slot of the moving plate.

The rotation of the handle results in the rotation of the camshaft which, in turn, disengages the pawl from the rack by means of the cam. When the pawl is released from the rack, the backrest may be manually rotated toward a fully reclined rear position or the bias of the coil power spring will automatically rotate the moving plate and backrest to a fully reclined forward position. As the moving plate rotates toward a fully reclined forward position, the camshaft is engaged within the narrower portion of the irregularly shaped slot and the pawl is positioned opposite a portion of the rack where there are no teeth. Further, the movement and change in width in the irregularly shaped slot causes the translational movement of the camshaft, and therefore, the cam and pawl are moved in a direction away from the rack such that a spaced relationship is maintained between the toothed portion of the pawl and the rack. When the narrow portion of the irregularly shaped slot moves into engagement with the camshaft, the rotational movement of the camshaft is prevented thereby maintaining the handle in a released position until the backrest is manually rotated back to its upright position.

Thus, the present invention provides a recliner construction that is compact and concealed for longer service life. Further, interference, wear and potential damage to the teeth of the pawl and rack are minimized or eliminated by the present construction since the pawl remains disengaged during the entire movement of the backrest to a fully reclined forward position and during is subsequent return to an upright position.

Other advantages and meritorious features of the present invention will be more fully understood from the detailed description of the invention, the appended claims and the drawings, which are briefly described hereinbelow.

DESCRIPTION OF THE DRAWINGS

FIG. 6 is a side elevational view of the recliner assembly illustrating the fully reclined forward position of the backrest, with portions cut away for easier viewing.

FIG. 6A is a fragmentary view illustrating the position of the moving plate and pawl when the backrest is in its fully reclined forward position FIG. 7 is a perspective view of the recliner assembly of the present invention including a foot-operated release.

DETAILED DESCRIPTION OF THE INVENTION

Figure 1:
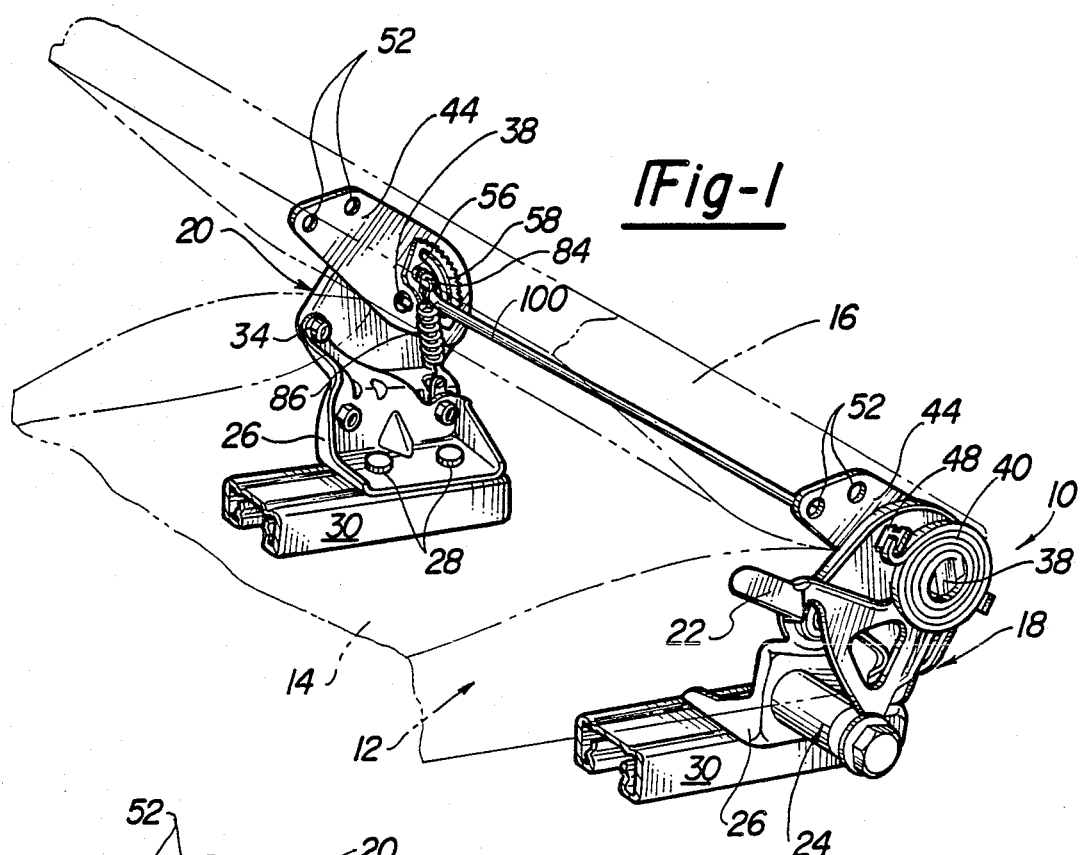
FIG. 1 is a perspective view of the recliner assembly of the present invention illustrating the fully reclined forward position of the backrest.

The dual sides recliner assembly 10 of the present invention is illustrated in FIGS. 1-7. As shown in FIG. 1, assembly 10 is used in conjunction with a typical automobile seat 12 comprising a bottom or seat part 14 and a backrest part 16. The backrest 16 is hingedly attached to seat 14 by means of assembly 10. As will be described, backrest 16 is selectively rotatable to various positions including the fully reclined forward position, which is shown in phantom lines in FIG. 1.

Figure 2:
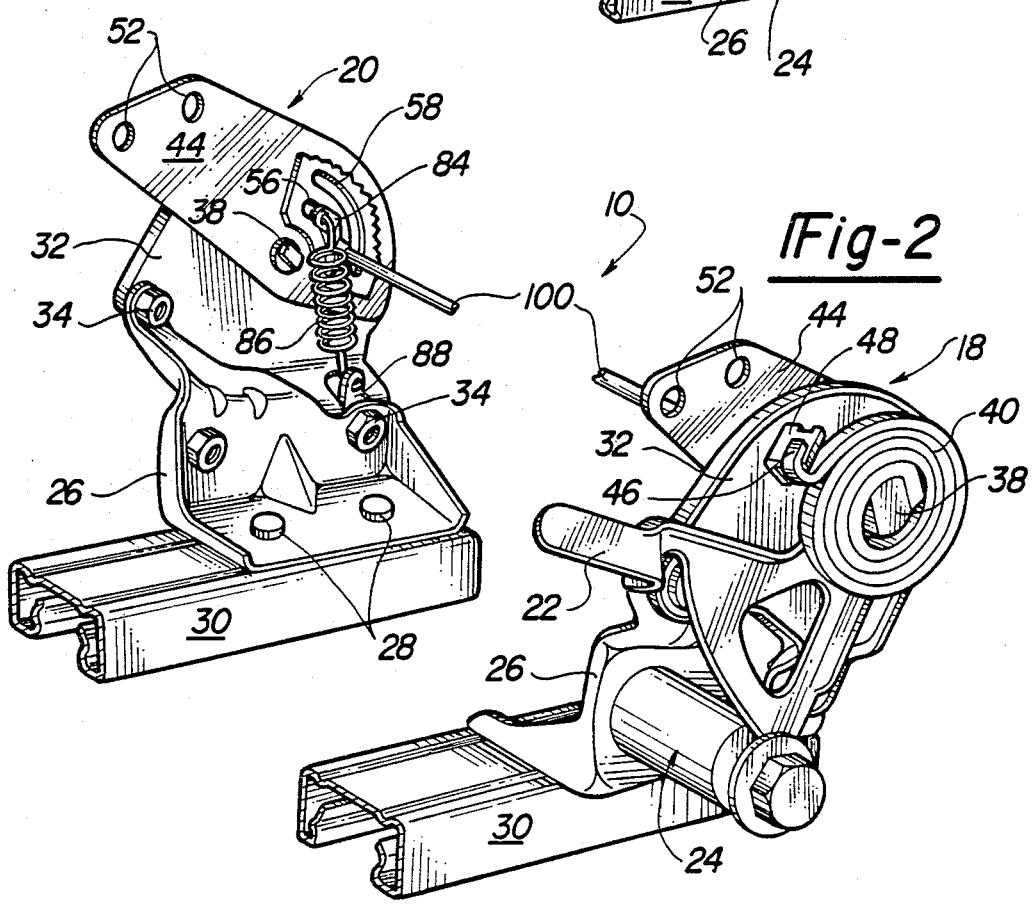
FIG. 2 is an enlarged perspective view of the recliner assembly illustrated in FIG. 1.
Figure 3:
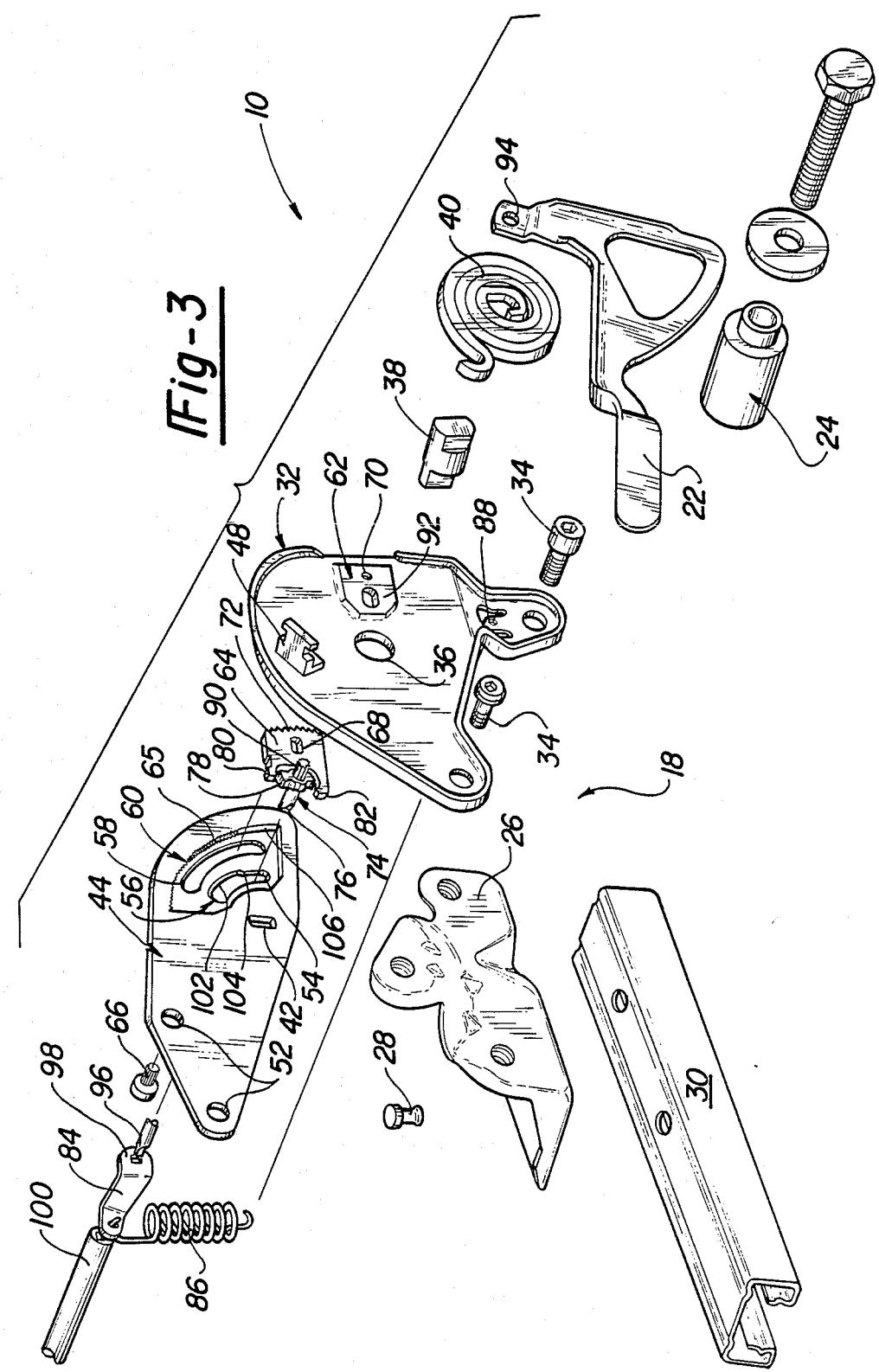
FIG. 3 is an assembly perspective view illustrating the principal component parts of the recliner assembly.

Referring now to FIGS. 1-3, recliner assembly 10 includes right and left subassemblies 18 and 20, respectively. The component parts of subassembly 20 are the mirror image of the component parts of subassembly 18 and operate identically, except that, a handle 22 and spacer assembly 24 for the handle are illustrated with subassembly 18 only. Thus, the following description of the component parts and their operation will be directed to the subassembly 18, however, it will be understood that the following description of the parts of subassembly 18 and their operation applied equally to the corresponding component parts in subassembly 20.

Subassemblies 18 and 20 each include a support bracket 26 which is secured by fasteners 28 to a longitudinally extending floor mounted track 30. A stationary plate 32 is attached to bracket 26 by means of fasteners 34. Plate 32 includes an opening 36 (FIG. 3) which rotatably supports the mid-portion of pivot pin 38. One end of the pivot pin 38 is lockingly engaged to the center of coil power spring 40 while its opposite end is lockingly engaged within opening 42 in moving plate 44. The outer end 46 of power spring 40 engages a fixed tab 48 on plate 32. Thus, pin 38 is constantly biased by coil power spring 40 to rotate moving plate 44 toward the position shown in FIGS. 1 and 2.

Backrest 16 is secured between the opposed moving plates 44 by fasteners 50 (FIG. 4) which extend throug openings 52 in plates 44. Each moving plate 44 includes a recessed area 54 (FIG. 3) having two arcuate slots, 56 and 58, and an arcuate rack or tooth form 60 along one of the edges within the recessed area 54. The width of the opening provided in slot 58 is uniform along its length. However, the width of the opening within slot 56 is irregular such that a portion of its length is of one width and another portion of its length is of a greater width. The purpose for the irregular shape of slot 56 will be described in connection with the operation of the recliner assembly 10.

Stationary plate 32 also includes a recessed area 62 (FIG. 3) which is opposed to the recessed area 54 in plate 44 when the plates 32 and 44 are assembled. A pawl 64 is contained between the opposed surfaces of recesses 54 and 62 for movement therein. Pawl 64 is slidably retained by pawl recess 62 on plate 32 and pawl pin 66 which extends through plate slot 58 and elongated pawl slot 68 for securement in opening 70 in stationary plate 32. As shown, an arcuate toothed portion 72 is provided on an edge of pawl 64 for selective engagement with the toothed portion 65 of arcuate rack 60. The toothed portion 72 of pawl 64 is selectively moved toward/away relative to pivot pin 38 by means of cam 74 which is mounted on camshaft 76.

Cam 74 includes lobes 78 which engage tangs 80 and 82 on pawl 64 for pushing pawl 64 toward or pulling pawl 64 away from rack 60, thereby engaging or disengaging the toothed portion 72 of pawl 64 with the toothed portion 65 of rack 60. An offset lever 84 is connected to camshaft 76 and a tension spring 86 is connected to lever 84 for biasing lever 84 and camshaft 76.

The ends of spring 86 are connected between lever 84 and a tab 88 on stationary plate 32. The knurled end 90 of camshaft 76 extends through an enlarged opening 92 in plate 32 for attachment within opening 94 (FIG. 3) in handle 22. The opposite end 96 of camshaft 76 extends through opening 98 in lever 84 for attachment within an end of tie rod 100. Cam 74 may be rotated by handle 22 and it is capable of translation movement to the extent that the length of opening 92 is larger than the diameter of camshaft 76.

It will be understood that cam 74 is normally biased by spring 86 to push pawl 64 toward locking engagement with rack 60. If handle 22 is manually rotated (i.e., clockwise in FIG. 2), the bias of spring 86 is overcome which results in cam 74 pulling pawl 64 away from rack 69 thereby releasing the toothed portion 72 of pawl 64 from the toothed portion 65 of rack 60. When the toothed portion 72 of pawl 64 is released from rack 60, the substantial rotational biasing force from coil power spring 40 is transmitted to pivot pin 38 which, in turn, causes the rotation of moving plate 44 and backrest 16 toward a fully reclined forward position, as shown in FIG. 1.

The backrest 16 may also be moved toward a fully reclined rear position by rotating handle 22 and exerting a force on backrest 16 in a direction opposite to the force being applied by coil power spring 40 until the desired rearward inclination is reached. The backrest 16 may be moved rearwardly in one motion to the fully reclined rear position or it may be moved in small increments. The rotational movement of handle 22 is transmitted from subassembly 18 to subassembly 20 through tie rod 100 so that the pawls 64 in both subassemblies are unlocked at the same time.

Figure 4:
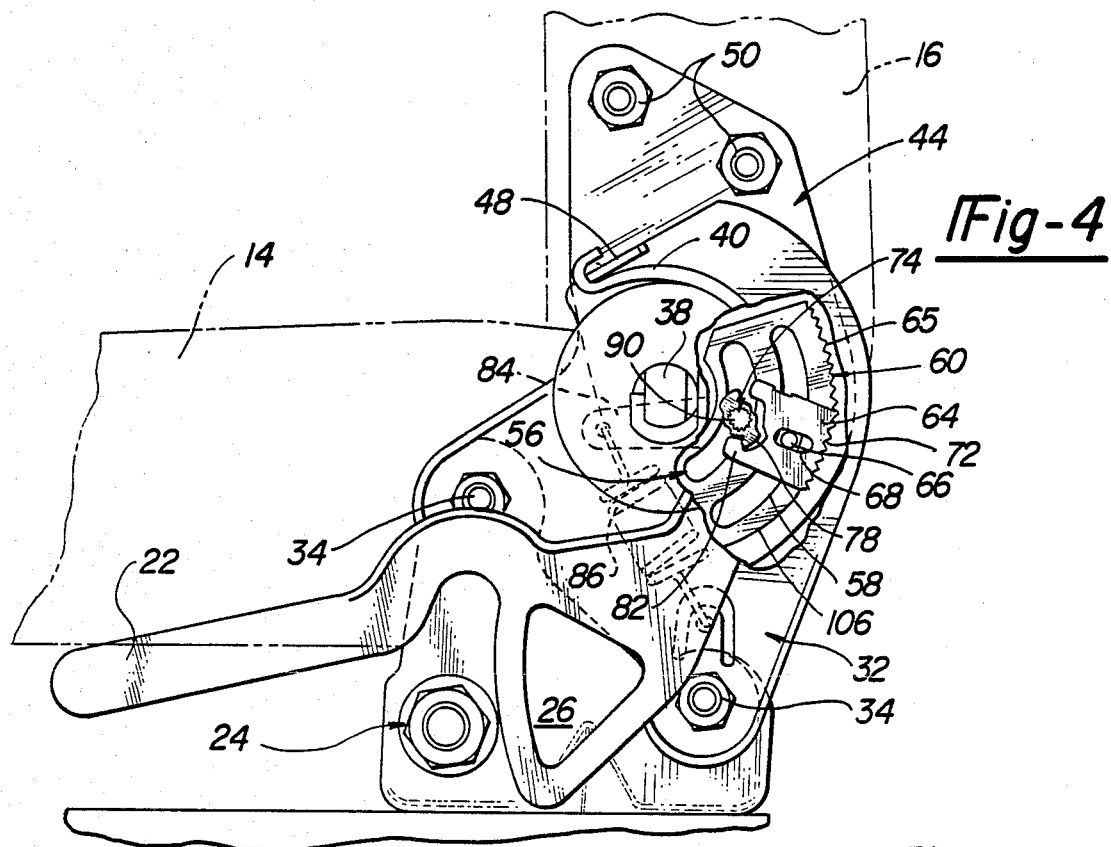
FIG. 4 is a side elevational view of the recliner assembly illustrating the backrest in its normal upright position, with portions cut away for easier viewing.
Figure 5:
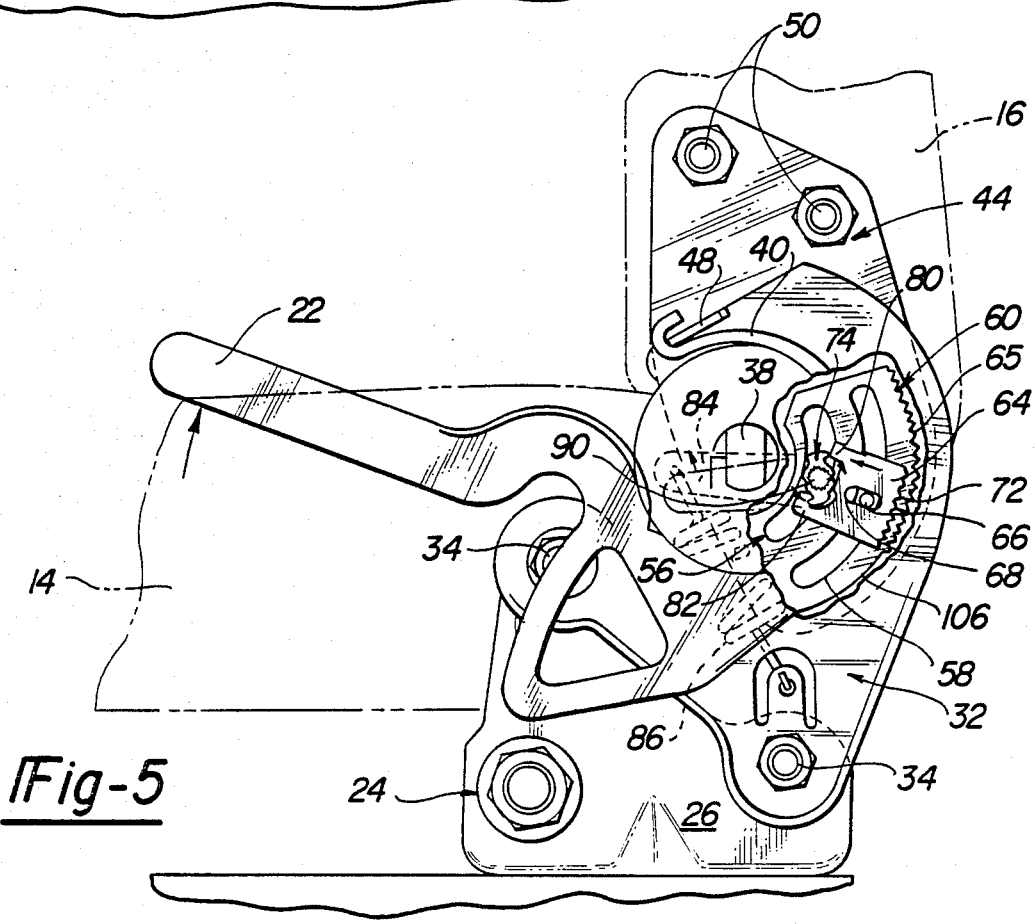
FIG. 5 is a side elevational view of the recliner assembly illustrating the instantaneous position of the pawl when the handle has been rotated to release the pawl.

Referring now to FIGS. 4–6, the operation of recliner assembly 10 will be described. FIG. 4 illustrates seat 12 with backrest 16 in a generally upright position, as would be typically encountered when the passenger opens the automobile door for entry. In this position, the toothed portion 72 of pawl 64 is lockingly engaged at one area of the toothed portion 65 of rack 60. Further, the bias of spring 86 is transmitted through camshaft 76 and cam 74 to pawl 64 for holding toothed portion 72 in engagement with rack 60. Moreover, as shown, camshaft 76 is positioned within the wider portion 102 of slot 56.

FIG. 5 illustrates the initial position of the various components during the instant when handle 22 is rotated thereby releasing pawl 64 from rack 60. As described previously, the rotation of handle 22 results in the rotation of camshaft 76 which, in turn, disengages pawl 64 from rack 60 by means of cam 74. When pawl 64 is released from rack 60, backrest 16 may be manually rotated toward a fully reclined rear position (i.e., clockwise in FIG. 5), or the bias of power spring 40 will automatically rotate plate 44 and backrest 16 (i.e., counterclockwise in FIG. 5) to a fully reclined forward position, as previously described.

FIG. 6 illustrates the component parts in a fully reclined forward position. By comparing FIGS. 5, 6 and 6A, it will be apparent that as plate 44 rotates, camshaft 76 is engaged within the narrower portion 104 of slot 56 and pawl 64 is positioned opposite a portion 106 of rack 60 where there are no teeth. Further, the movement and change in width of slot 56 causes the translational movement of camshaft 76, and therefore, cam 74 and pawl 64 in a direction away from rack 60 such that a spaced relationship is maintained between the toothed portion 72 of pawl 64 and the toothed portion 65 of rack 60.

Moreover, when the narrower portions 104 of slot 56 moves into engagement with camshaft 76, rotational movement of camshaft 76 in response to the bias of spring 86 is prevented, thereby maintaining handle 22 in a raised position as shown in FIG. 6. When backrest 16 is manually rotated back to an upright position as shown in FIG. 4, handle 22 will automatically return to its normal lowered position and the toothed portion 72 of pawl 64 will automatically return into engagement with the toothed portion 65 of rack 60 at a location that is immediately adjacent to the portion 106 of rack 60 which has no teeth.

Thus, the present invention provides a recliner constructon that is compact and concealed for longer service life. Further, interference or wear and potential damage to the teeth of pawl 64 and rack 60 are minimized by the present construction since pawl 64 and lever 22 remain in their respective disengaged positions during the entire movement of backrest 16 to a fully reclined forward position and during its subsequent return to an upright position.

FIG. 7 illustrates the recliner assembly 10 with the addition of a foot-operated lever 108, which is connected to tie rod 100. This permits release and movement of backrest 16 to a fully reclined forward position by a passenger in the rear seat of the vehicle. As illustrated, lever 108 is rotated by the passenger's foot which rotates tie rod 100 and releases the toothed portion 72 of pawl 64 from the toothed portion 65 of rack 60. This results in the immediate rotation of backrest 16 to a fully reclined forward position, as previously described, thereby permitting an easier exit from the rear seat of the vehicle by the passenger.

It will be obvious to those skilled in the art that various modifications can be made to the recliner assembly and components used therein without departing from the spirit and scope of the present invention, which is defined by the appended claims.

We claim:

1. A recliner assembly for a seat having a backrest which is movable between a generally upright position, a fully reclined forward position, and a fully reclined rear position, said recliner assembly comprising:

a stationary plate;

a moving plate rotatably mounted to said stationary plate, said moving plate connected to said backrest, and means for rotating said moving plate and backrest in a first direction toward said fully reclined forward position;

said moving plate includes a recessed area having an edge and said stationary plate includes an opposed recessed area, actuator means contained between and enclosed within the recessed areas for movement therein, and means for biasing said actuator means into engagement with the edge of the recessed area in said moving plate;

means for moving said actuator means out of engagement with the edge of the recessed area in said moving plate when said backrest is in said generally upright position wherein said backrest automatically rotates in said first direction to said fully reclined position in response to said rotating means;

said backrest being selectively manually movable in a second direction from said generally upright position toward said fully reclined rear position when said actuator means is moved out of engagement with the edge of the recessed area in said moving plate; and means for maintaining a spaced relationship between said actuator means and the edge of the recessed area in said moving plate throughout the movement of said backrest from said generally upright position to said fully reclined forward position and from said fully reclined forward position to said generally upright position;

wherein said actuator means includes a pawl member, said biasing means for said actuator means includes a cam member engaging said pawl member, said cam member mounted on a camshaft, said pawl member having a toothed portion along an edge thereof, said edge of the moving plate recessed area having a toothed portion, said spring means connected to said camshaft for normally biasing the toothed portions into engagement with one another;

wherein said moving means includes a lever connected to said camshaft for applying a rotative force to said camshaft which is opposite to the rotative force being applied to said camshaft by said spring means;

wherein said means for maintaining a spaced relation includes means for permitting translational movement of said camshaft and an irregularly shaped opening within the recessed area of said moving plate which engages said camshaft for moving the toothed portions apart during movement of said moving plate.

2. The recliner assembly as defined in claim 1 wherein said rotating means includes a pivot pin connected at one end to said moving plate and at its opposite end to a coil spring, a mid-portion of said pivot pin rotatably supported by said stationary plate, and said coil spring applying a constant rotative force on said pivot pin for biasing said moving plate toward said fully reclined forward position.

3. The recliner assembly as defined in claim 1 wherein the irregularly shaped opening is arcuate with a portion of its length having a first width and another portion of its length having a greater width.

4. The recliner assembly as defined in claim 3 wherein the edge of the recessed area in said moving plate includes a portion having no teeth which is opposite to the toothed portion of the pawl member when said backrest moves from said generally upright position to said fully reclined forward position.

5. The recliner assembly as defined in claim 4 wherein the recessed area in said moving plate includes a regularly shaped opening having a uniform width along its length, said uniform shaped opening being arcuate and substantially parallel to said irregularly shaped opening, said pawl member includes an elongated slot, and pin means extending between the recessed areas through the elongated slot.

6. The recliner assembly as defined in claim 5 wherein said cam member is contained between and enclosed within the recessed areas, said camshaft extending between said stationary plate and said moving plate, and said means for permitting translational movement includes an elongated slot in said stationary plate for supporting said camshaft.

7. The recliner assembly as defined in claim 6 wherein said cam member engages said pawl member on an end opposite to the toothed portion of said cam member, said cam member includes at least one lobe which engages a tang element on said pawl.

* * * * *